Oct. 9, 1951 W. C. WILT 2,571,083
CONDIMENT HOLDER AND DISPENSER HAVING PRESSURE
OPERATED MEANS FOR DISPENSING THE CONDIMENT
Filed Feb. 25, 1946
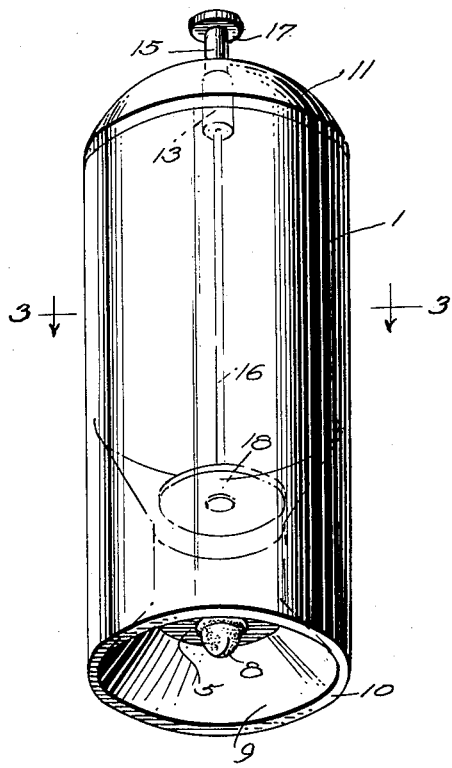
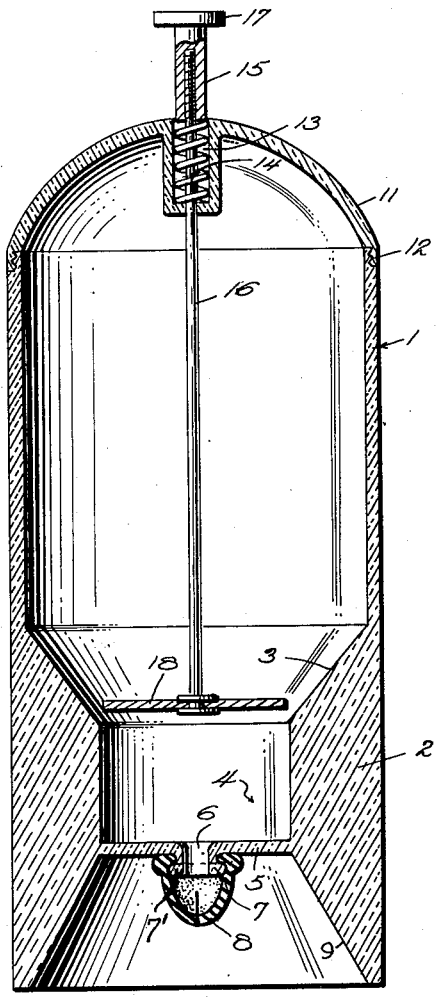
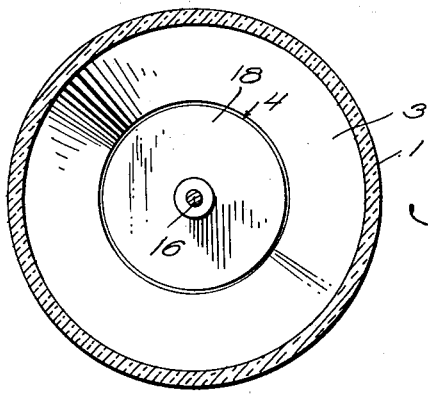
INVENTOR,
Wilmer C. Wilt,
BY
Frank S. Appleman,
ATTORNEY.

Patented Oct. 9, 1951

2,571,083

UNITED STATES PATENT OFFICE 2,571,083

CONDIMENT HOLDER AND DISPENSER HAVING PRESSURE OPERATED MEANS FOR DISPENSING THE CONDIMENT

Wilmer C. Wilt, Red Lion, Pa.

Application February 25, 1946, Serial No. 649,837

1 Claim. (Cl. 222—184)

This invention relates to condiment holders and dispensers, and particularly to a container in which means are provided for intermittently forcing the contents of the container and discharging it at the bottom of the container so that the said condiment may be distributed over any article of food to which the condiment is to be applied.

It is an object of the invention to provide a container having means by which it is supported with its discharge nozzle or nipple in elevated position with respect to the base, table or the like on which the condiment is placed.

It is further an object of this invention to provide a condiment holder and dispenser in which the material of the container may be glass or any plastic composition suitable for the purpose; the said container having a bottom portion partially solid, except for the presence therein of a well or chamber to which the condiment is directed through the employment of an inclined wall or surface, the said well having an outlet or nozzle and a nipple through which the contents of the holder is discharged, the said nipple closing when pressure is removed from within, so that dripping of the condiment will be obviated.

It is furthermore an object of the invention to provide an expelling means within the container comprising a piston movable in the well or chamber, closely fitting the wall of the well or chamber so that the condiment may be discharged through the nipple.

It is furthermore an object to provide means including a manually operated piston rod connected to the piston and a retracting means, such as a spring for returning the manually operated element to its normal position which is an elevated position with respect to the well or chamber, it being understood that the piston should rise above the upper edge of the well or chamber so that the contents of the container will gravitate into the well for a repetition of the operation.

It is furthermore an object to provide a cover removably secured to the container, the said cover carrying the piston rod and piston when it is removed from the container, so that by this means the container may be kept sanitary and free of accumulated or dried contents.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which:

Figure 1 illustrates a view in perspective showing the invention;

Figure 2 illustrates an enlarged vertical sectional view; and

Figure 3 illustrates a sectional view on the line 3—3 of Fig. 1.

In these drawings I denotes a container which may be of glass so that the contents thereof may be observed, though it is the thought of the inventor that opaque material colored to denote the condiment which it contains, as, for instance, yellow for mustard or red for catsup may be employed, but that is a detail which is subject to change to suit particular requirements. It is shown that the container has an internal construction in which a thick annular wall 2 is formed, the upper surface 3 of which is beveled or inclined toward a depression or well 4 in which the condiment collects by gravity, and the bottom 5 of the well has an opening 6 therein, through which the condiment is discharged. A depending tube 7 on the bottom 5 merges with the opening 6, and the end thereof is provided with a circumferential bead 7'. A diaphragm or nipple 8 is applied to the bead 7' of the tube, and it has an opening through which the condiment is discharged, and the operation is such that when pressure is removed after discharging the condiment, the resilient character of the nipple causes it to close to prevent the escape of drippings.

The thickened wall 2 is furthermore provided with an inner surface 9 which is flared from the bottom of the well to the outer surface of the thickened portion so that a round base 10 is produced which may be supported on a counter, table, or the like, and the space encompassed by the inner surface may be regarded as a chamber through which the condiment passes in its escape from the container, and the discharged condiment may be directed to any article of food, or the like, with which it is to be used.

A cover 11 of appropriate material may have a screw joint 12 with the container, and the said cover has a recess 13 in which a spring 14 is seated. A plunger or piston 15 is approximately the diameter of the well, and a rod 16 connected to the piston extends through the top or cover 11 and through the spring 14 and it projects above the cover and is provided with a thumbpiece or button 17 which is to be pressed by an operator when the contents of the container is to be forced out or dispensed. The rod 16 has a shoulder or disk 18 fastened to it and it is engaged by the upper end of the spring 14 which acts to return the parts to normal positions in which they are shown in the drawings.

The disk is preferably held slightly above the upper edge of the chamber or well so that when in such position the contents of the container may gravitate into the well, and hence is always set for successful operation in forcing the material from the well.

I claim:

A condiment holder and dispenser comprising a hollow body having a thickened internal wall near the lower end thereof and an open upper end, a cover detachably connected to the upper end of the body, said thickened wall surrounding a well, a bottom wall for the well provided with an aperture therein, a tube registering with the aperture, a nipple on the tube through which the condiment disposed within the hollow body is discharged, a beveled upper surface on the thickened wall converging inwardly to the well, a beveled lower surface diverging from the bottom wall of the well to a point adjacent the outer edge of the body, said cover having a recessed portion therein, a rod extending through the recessed portion and into the hollow body, an operating head on the upper end of the rod, a disk on the lower end of the rod, and a spring disposed within the recessed portion surrounding the rod normally supporting the disk within the body above the well, the arrangement being such that depression of the operating head moves the disk into the well to force the condiment through the nipple.

WILMER C. WILT.

REFERENCES CITED

The following references are of record in the file of this patent:

UNITED STATES PATENTS

| Number | Name | Date |
|---|---|---|
| 1,171,575 | Zsidakovitz | Feb. 15, 1916 |
| 1,862,662 | Costello | June 14, 1932 |
| 1,951,910 | Heffner et al. | Mar. 20, 1934 |
| 2,303,997 | Hogg | Dec. 1, 1942 |
| 2,363,474 | Schlesinger | Nov. 21, 1944 |